(12) United States Patent
Catelli et al.

(10) Patent No.: US 10,874,243 B2
(45) Date of Patent: Dec. 29, 2020

(54) METHOD AND PLANT FOR THE PRODUCTION OF APPLE SAUCE

(71) Applicant: CFT S.P.A., Parma (IT)

(72) Inventors: Roberto Catelli, Parma (IT); Mario Gozzi, Parma (IT); Stefano Romei, Parma (IT)

(73) Assignee: CFT S.P.A., Parma (IT)

( * ) Notice: Subject to any disclaimer, the term of this patent is extended or adjusted under 35 U.S.C. 154(b) by 296 days.

(21) Appl. No.: 16/163,815

(22) Filed: Oct. 18, 2018

(65) Prior Publication Data

US 2019/0045963 A1    Feb. 14, 2019

Related U.S. Application Data

(62) Division of application No. 13/673,152, filed on Nov. 9, 2012, now abandoned.

(51) Int. Cl.
| | |
|---|---|
| *A47J 27/00* | (2006.01) |
| *A23L 19/00* | (2016.01) |
| *A23B 7/005* | (2006.01) |

(52) U.S. Cl.
CPC .............. *A47J 27/00* (2013.01); *A23B 7/0053* (2013.01); *A23L 19/09* (2016.08)

(58) Field of Classification Search
CPC ......... A47J 27/00; A23L 19/09; A23B 7/0053

USPC .......................................................... 426/53
See application file for complete search history.

(56) References Cited

U.S. PATENT DOCUMENTS

| | | | |
|---|---|---|---|
| 3,019,113 | A  | 1/1962 | Rooker |
| 3,103,438 | A  | 9/1963 | Rowse |
| 3,235,391 | A  | 2/1966 | Dorsey |
| 5,244,685 | A  | 9/1993 | Metcalf et al. |
| 6,383,546 | B1 | 5/2002 | Powrie et al. |

FOREIGN PATENT DOCUMENTS

EP    2022342 A1    2/2009

*Primary Examiner* — Jyoti Chawla
(74) *Attorney, Agent, or Firm* — Pearne & Gordon LLP

(57) ABSTRACT

Method for the production of apple sauce including the following steps:
- slicing apples generating a plurality of slices having two opposite faces and a peel which develops continuously between the two opposite faces;
- pulping the slices obtaining a first product and a first waste;
- refining the first waste generating a second product and a second waste;
- mixing the first product and the second product;
- heating the combination of the first product and the second product in order to deactivate enzymes contained therein.

12 Claims, 1 Drawing Sheet

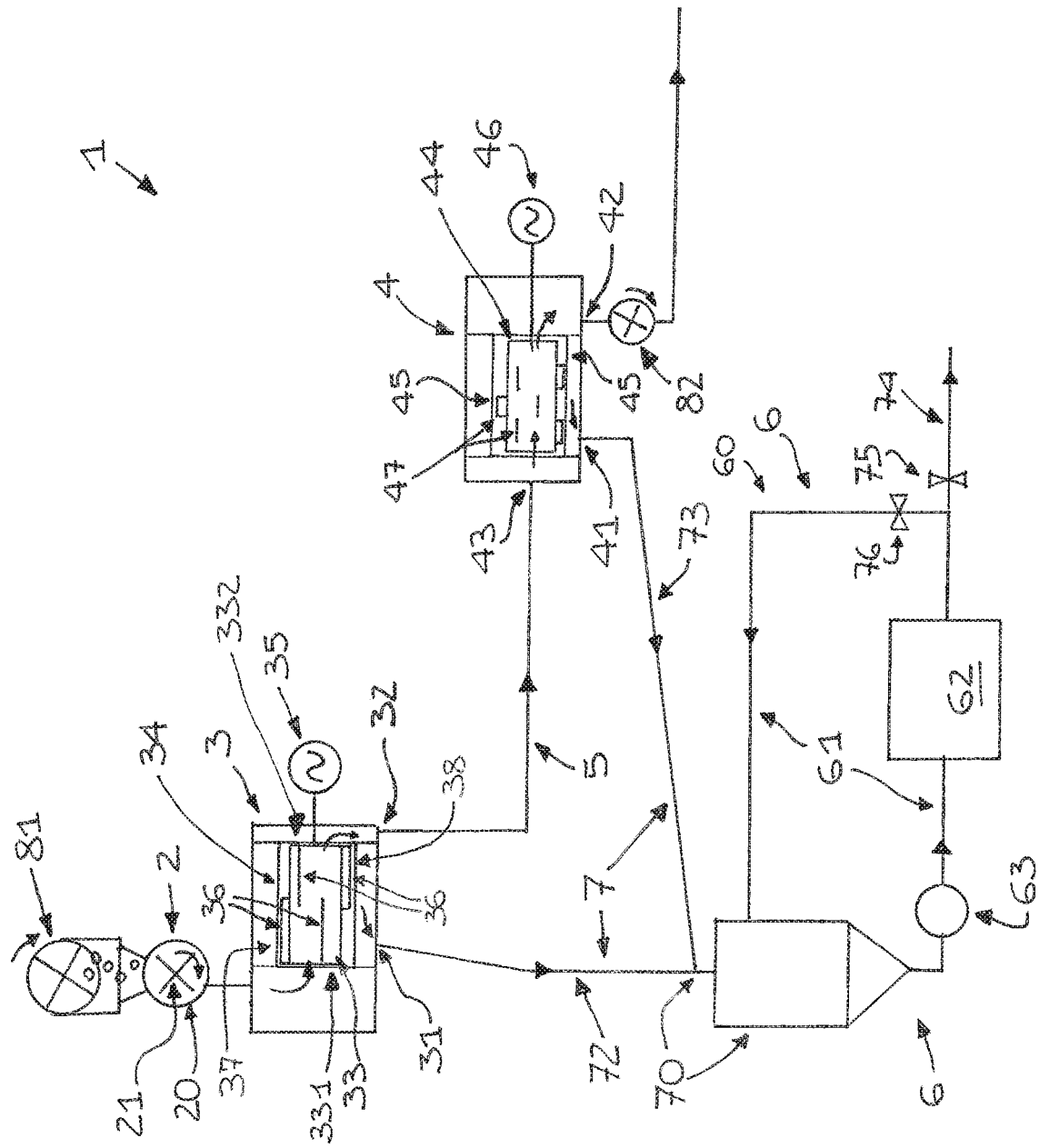

METHOD AND PLANT FOR THE PRODUCTION OF APPLE SAUCE

BACKGROUND OF THE INVENTION

The invention relates to a method and a plant for the production of apple sauce. Apple sauce is a food well known in the state of the art. Apple sauce is made out of fresh apples by removing peels, seeds, peduncles and stamens. There is a regular and a chunky variety that contains crispy apple chunks. It is often used as an accompaniment, as a snack or as a dessert.

A known plant for producing apple sauce comprises a grader that separate the apples into two or more streams depending from their size.

The bigger apples are introduced in a mechanical peeling machine that partially removes the peels and the core obtaining a first semi-processed product.

The smaller apples are triturated and refined obtaining a second semi-processed product. The first and the second semi-processed products are introduced together in a cooking station in which there is a direct injection of the steam and then are introduced in a refiner.

One drawback of this technical solution is related to the low throughput and low extraction yield. In fact the mechanical peeler removes not only the peel and the core but also a portion of the pulp. Furthermore some apples might be missed by the peeler and discharged into the waste stream.

A known plant used for the production of purée or regular apple sauce is disclosed in EP2022342 and it comprises the following steps:
triturating a food product;
refining the triturating product forcing it through a sieve;
heating the purée in order to deactivate enzymes contained therein and to prevent deterioration of the purée.

However using this plant for producing chunky apple sauce has some drawbacks. In particular the triturating action and the subsequent refining of the apples generate a purée which is smooth and does not contain crispy apple chunks. So it is far from the expectations of the final user. Increasing the size of the holes of the sieve could permit the presence of bigger apple chunks but in the final product there would be also an increased quantity of seeds, peels and other undesired elements (in this regard the presence of waste products in the apple sauce is regulated by strict rules such as the United States Department of Agriculture "Grading Manual for Canned Apple Sauce").

SUMMARY OF THE INVENTION

The aim of the present invention is to provide a method and a plant for producing apple sauce which permit to obtain the following effects:
optimizing the use of the pulp of the fruit;
minimizing the presence of waste products in the apple sauce;
generating a chunky apple sauce with crispy apple chunks.
minimizing the consumption of artificial anti oxidants such as ascorbic acid

BRIEF DESCRIPTION OF THE DRAWINGS

Further characteristics and advantages of the process of the invention will better appear from the detailed description that follows with reference to the accompanying figures of the drawings, given by way of non limiting illustration, in which:

FIG. 1 discloses a schematic view of the plant according the present invention.

DETAILED DESCRIPTION OF THE INVENTION

The present invention relates to a method for the production of apple sauce.

The method comprises the step of slicing apples (preferably whole apples). Preferably during the step of slicing, the apples are raw apples. In this way a plurality of slices (having two opposite faces and a peel which develops between said two opposite faces) are obtained. So the peel of each slice of said plurality of slices is shaped like a strip.

Preferably the peel of said slices develops continuously in an annular shape. The step of slicing the apples comprises the step of generating slices whose thickness is comprised between $1/16$ inch and $7/8$ inch. The opposite faces of said plurality of slices are parallel to each other. The step of slicing the apples is realized using a slicer 2.

Preferably the slicer 2 is a rotary slicer 2. The method comprises the step of conveying whole apples to an inlet of the slicer 2.

The step of slicing the apples comprises the step of:
introducing (preferably by gravity) the whole apples into a chamber 20 in which there is a rotating element 21 which comprises at least one blade; the rotating element 21 and the chamber 20 are parts of the slicer 2;
extracting (preferably by gravity) the slices from an outlet of the slicer.

The step of conveying the apples to the inlet of the slicer 2 could comprise a step in which the apples pass along a first rotary sector valve 81.

The method also comprises the step of pulping the slices obtaining a first product and a first waste.

The step of pulping the slices comprises the step of forcing the slices against a first sieve 34. The step of forcing the slices comprises the step of rotating a first rotor 33 having a plurality of blades 36; the first rotor 33 forces the slices against the first sieve 34 by means of centrifugal force.

Said first sieve 34 surrounds the first rotor 33 and separates the first product (containing the chunky pulp of the apples) from the first waste. In fact the step of forcing the slices comprises the step of compressing the slices against the first sieve 34 and one part of the slices (the pulp) passes through the first sieve 34 generating the first (chunky) product (while a second part of the slices does not pass through the first sieve 34 generating the first waste). The first sieve 34 holds the first waste. It is important that the apples are sliced. In this way the continuous peel of the slice is a long strip that does not pass through the first slicer and the surface of pulp exposed to the contact with the screen is wider.

Said first sieve 34 surrounds the first rotor 33 and separates the first product from the first waste.

The step of pulping the slices happens in a first refiner 3. The first refiner 3 has an outlet 31 for the first product (the chunky sauce) and an outlet 32 for the first waste (peels, seeds, stamens, blossoms, part of the pulp, etc.).

Preferably the first rotor 33 comprises a first axial end 331 and a second axial end 332.

The slices enter into the first rotor 33 in correspondence of the first axial end 331 and are discharged in correspondence of the second axial end 332.

The method comprises the step of conveying (for example by a volumetric pump or by gravity) the first waste from the first refiner 3 to the second refiner 4. During this step the first waste flows along a first duct 5.

The method comprises also the step of refining the first waste generating a second product and a second waste. The step of refining the first waste happens in said second refiner 4. The second refiner 4 has an outlet 41 for the second product and an outlet 42 for the second waste.

The step of refining the first waste comprises the step of forcing the first waste through a second sieve 45. The step of forcing the first waste through the second sieve 45 comprises the step of rotating a second rotor 44 having a plurality of blades 47. The rotation of the second rotor 44 is faster than the rotation of the first rotor 33. Said second sieve 45 surrounds the second rotor 44 and separates the second product from the second waste. In fact the step of forcing the first waste comprises the step of compressing the first waste against the second sieve 45 and one part of the first waste passes through the second sieve 45 generating the second product (while a second part of the first waste does not pass through the second sieve 45 generating the second waste). Holes belonging to the first sieve 34 and permitting the passage of the first product are greater than the holes of the second sieve 45 permitting the passage of the second product. In fact the first sieve 34 generates crispy apple chunks which are typical of the chunky apple sauce while the second sieve 45 avoids excessive waste.

The holes of the first sieve 34 permitting the passage of the first product have a surface comprised between 0.0011 square inches and 0.044 square inches (preferably comprised between 0.0046 square inches and 0.031 square inches). The holes of the second sieve 45 permitting the passage of the second product have a surface comprised between 0.00018 square inches and 0.0047 square inches (preferably comprised between 0.00031 square inches and 0.00039 square inches).

The method comprises also the step of mixing the first product and the second product.

Downstream to the first refiner 3 the first product flows in a second duct 72.

Advantageously the first product could flow by gravity in the second duct 72.

Downstream to the second refiner 4 the second product flows in a third duct 73.

Advantageously the second product could flow by gravity in the third duct 73. The second and the third ducts 72, 73 are connected reciprocally in a mixing zone 70.

The method comprises also the step of heating the combination of the first product and of the second product in order to deactivate enzymes (especially oxidative and pectolitic enzymes) contained therein. Preferably the step of heating the first product and the second product happens in a cooking station 60. Said cooking station 60 is, at least in part, downstream to the mixing zone 70.

The step of heating the combination of the first product and the second product in order to deactivate enzymes contained therein comprises the step of heating the combination of the first and the second products to a temperature comprised between 140° F. and 230° F. The step of heating is performed immediately after obtaining the first and the second product. The step of heating causes an immediate and considerable increase in the temperature of the combination of the first and second product.

The step of heating the combination of the first product and the second product comprises the step of:

introducing the first and the second product into a recycling circuit 61;

moving the first and the second product through the recycling circuit 61 (advantageously the flow rate of the first and the second product moving through the recycling circuit 61 is preferably five times the flow rate of the first and the second product introduced into the circuit by the first and the second refiner 3, 4);

transmitting heat to the first and the second product moving through the recycling circuit 61 by means of a heater 62 arranged there-along (advantageously the heater comprises at least one tube in which flows a hot fluid, the hot fluid does not come in contact with the first and second product);

extracting the first and second product from the recycling circuit 61 (through the fourth duct 74 that can be connected to the recycling circuit 61 by the valve 75;

advantageously the flow of hot fluid to the heater is retroactively controlled by a thermostat predisposed to acquire the temperature of the product internally of the recycling circuit 61).

Also the method comprises a stage of conveying the vapors generated during the heating stage to the first refiner 3 and/or to the second refiner 4.

Alternatively the step of heating the combination of the first product and the second product comprises the step of heating the first and the second product which flow in a single pass (no re-circulation) conduit. In that case a heating fluid can be introduced directly into the single pass conduit and merge with the combination of the first and the second product (direct injection heating) or can flow in the external side (shell side) of the single pass conduit (in the latter case the heating fluid does not come directly in contact with the first and second product and an indirect heating is achieved).

Alternatively the step of heating the combination of the first and the second product comprises the step of conveying electrical current through the combination of the first and the second product.

In a particular solution the step of heating can be performed by a single unit 62 which comprise one or more of the following heaters:

a first heater comprising a tube bundle or a tube in tube or a scraped surface heat exchanger preferably disposed along a recycling circuit (having an outlet that can be at least partially closed by a valve);

a second heater comprising a direct-injection steam exchanger;

a third heater comprising means for conveying electrical current through the combination of the first and the second product (ohmic heating).

Advantageously the step of heating the combination of the first and the second product comprises the step of activating only one heater of said plurality of heaters.

An object of the present invention is also a plant for the production of apple sauce comprising:

a slicer 2 which generates a plurality of slices comprising two opposite faces and a continuous peel interposed between the two opposite faces;

a first refiner 3 which is downstream to the slicer 2, the first refiner 3 comprising an outlet 31 of a first product and an outlet 34 of a first waste;

a second refiner 4 which in turn comprises: an inlet 43 of the first waste, an outlet 41 of a second product and an outlet 42 of a second waste;

a first duct 5 connecting the outlet 32 of the first waste of the first refiner 3 and an inlet 43 of the second refiner 4, the second refiner 4 being downstream to the first refiner 3 considering the flow of the first waste along the duct 5;

means 6 for deactivating enzymes in the first product and in the second product, said means for deactivating enzymes comprising a cooking station 60;

means 7 for connecting the means 6 for deactivating the enzymes to the outlet 31 of the first product of the first refiner 3 and to the outlet 41 of the second product of the second refiner 4.

Advantageously said slicer and/or said first refiner and/or said second refiner comprise/s one or more features disclosed previously during the description of the method.

The first refiner 3 in turn comprises:
a first rotor 33 having a plurality of blades 36;
a first sieve 34 which surrounds the first rotor 33 and having a group of holes.

The blades 36 of the first rotor 33 at least in one configuration develop axially for more than half of the axial development of the first rotor 33.

The first rotor 33 can rotate around a first axis and comprises a first and a second half 37, 38 of the first rotor 33 which are side by side along said first axis.

The blades 36 of the first rotor is circumferentially disposed around said first axis. The blades 36 are alternated on the first half 37 and on the second half 38 of the first rotor 33.

The second refiner 4 in turn comprises:
a second rotor 44 having a plurality of blades 47;
a second sieve 45 which surrounds the second rotor 44 and comprises a group of holes; the holes of the first sieve 34 being greater than the holes of the second sieve 45.

The holes of the first sieve 34 having a surface comprised between 0.0011 square inches and 0.044 square inches. The holes of the second sieve 45 have a surface comprised between 0.00018 square inches and 0.0047 square inches. The number of blades of the second rotor 44 is higher than the number of blades of the first rotor 33. In the first rotor 33 increasing the axial length of the blades and reducing the number of the blades permit to obtain a gentle action on the slices thus preserving the integrity of the chunks and reducing the presence of defects in the product while in the second rotor 44 there is a stronger action on the first waste to obtain high extraction yields.

As indicated previously the plant 1 could comprise a first rotary sector valve 81.

Advantageously the first rotary sector valve 81 is upstream to the slicer 2.

The plant 1 comprises a second rotary sector valve 82 or similar device which is downstream to the outlet of the second waste of the second refiner 4. The combination of the first and the second rotary sector valve 81, 82 permit to restrict the entry of air in the first refiner 3, the second refiner 4, the means 6 for deactivating enzymes.

In particular the plant 1 comprises:
a first engine 35 which drives the slicer 2;
a second engine 46 which drives the first rotor 33.

The inlet 43 of the second refiner 4 is at a lower level than the outlet 32 of the first waste of the first refiner 3. In this way the first waste can be conveyed by gravity from the first refiner to the second refiner (in an alternative solution a volumetric pump could be used).

Said means 6 for deactivating enzymes comprise a cooking 60 station. The cooking station 60 comprises a heater 62. The cooking station 60 in turn could comprise a recycling circuit 61 (the heater 62 being arranged along the recycling circuit 61) and means 63 for moving a purée along the recycling circuit 61. The outlet 31 of the first product opens directly above the recycling circuit 61. Preferably the heater 62 is a tube bundle heat exchanger.

In an alternative solution the heater 62 is a direct-injection steam exchanger. In an alternative solution the heater 62 comprises means for conveying electrical current through the combination of the first and the second product (Joule heating effect or Ohmic heating).

In a particular solution said means 6 for deactivating enzymes could comprise a single unit which in turn comprises a plurality of heaters.

Said plurality of heaters could comprise one or more of the following heaters which can be activated alternatively:
a first heater comprising a tube bundle or a tube in tube or a scraped surface heat exchanger (when this heater is activated the combination of the first and the second product can flow along a recycling circuit or can flow along a predetermined line without re-circulation; advantageously if the valve 76 is open and the valve 75 is closed there is a recirculation; if the valve 76 is closed and the valve 75 is open there is not recirculation);
a second heater comprising a direct-injection steam exchanger;
a third heater comprising means for conveying electrical current through the combination of the first and the second product.

The invention thus conceived allows many advantages to be obtained.

The first refiner permits to obtain a granular chunky product (this is important for having crispy apple chunks in the apple sauce). The first refiner generates a large amount of waste due to its gentle treatment (long continuous paddles and slow speed) but this is not a problem because the second refiner permits to recover at least in part the pulp from the first waste of the first refiner. In this way the final waste of the plant (indicated previously as "second waste") is very low.

The invention thus conceived is susceptible to numerous modifications and variants, all falling within the scope of the inventive concept which characterises it. Moreover, all the details may be replaced with other technically equivalent ones. In practice, all of the materials used, as well as the dimensions, can be any whatsoever according to need.

The invention claimed is:

1. A plant for the production of apple sauce comprising:
a slicer (2) which generates a plurality of slices comprising two opposite faces and a continuous peel interposed between the two opposite faces;
a first refiner (3) which is downstream to the slicer (2), the first refiner (3) comprising an outlet (31) of a first product and an outlet (34) of a first waste;
a second refiner (4) which in turn comprises: an inlet (43) of the first waste, an outlet (41) of a second product and an outlet (42) of a second waste;
a duct (5) connecting the outlet (32) of the first waste of the first refiner (3) and an inlet (43) of the second refiner (4), the second refiner (4) being downstream to the first refiner (3) considering the flow of the first waste along the duct (5);
means (6) for deactivating enzymes in the first product and in the second product, said means for deactivating enzymes comprising a cooking station (60);
means (7) for connecting the means (6) for deactivating the enzymes to the outlet (31) of the first product of the first refiner (3) and to the outlet (41) of the second product of the second refiner (4).

2. Plant according to claim 1, characterized in that the first refiner (3) in turn comprising:
  a first rotor (33) having a plurality of blades (36);
  a first sieve (34) which surrounds the first rotor (33) and having a group of holes.

3. Plant according to claim 2, characterized in that the blades (36) of the first rotor (33) at least in one configuration develop axially for more than half of the axial development of the first rotor (33).

4. Plant according to claim 2, characterized in that the first rotor (33) can rotate around a first axis and comprises a first and a second half (37,38) of the first rotor (33) which are side by side along said first axis;
  the blades (36) of the first rotor being circumferentially disposed around said first axis and being alternated on the first half (37) and on the second half (38) of the first rotor (33).

5. Plant according to claim 1, characterized in that the second refiner (4) in turn comprises:
  a second rotor (44) having a plurality of blades (47);
  a second sieve (45) which surrounds the second rotor (44) and comprises a group of holes; the holes of the first sieve (34) being greater than the holes of the second sieve (45); the holes of the first sieve (34) having a surface comprised between 0.0011 square inches and 0.044 square inches, the holes of the second sieve (45) having a surface comprised between 0.00018 square inches and 0.0047 square inches.

6. Plant according to claim 1, characterized in that it comprises:
  a first engine (35) which drives the slicer (2);
  a second engine (46) which drives the first rotor (33).

7. Plant according to claim 1, characterized in that the inlet (43) of the second refiner (4) is at a lower level than the outlet (32) of the first waste of the first refiner (3).

8. Plant according to claim 1, characterized in that said means (6) for deactivating enzymes comprise a cooking (60) station which in turn comprises a recycling circuit (61), a heater (62) arranged along the recycling circuit (61) and means (63) for moving a pure along the recycling circuit (61), the outlet (31) of the first product opening directly above the recycling circuit (61).

9. Plant according to claim 1, characterized in that said means (6) for deactivating enzymes comprise a cooking (60) station which in turn comprises a heater (62), the heater (62) comprising a tube bundle heat exchanger.

10. Plant according to claim 1, characterized in that said means (6) for deactivating enzymes comprise a cooking (60) station which in turn comprises a heater (62), the heater (62) comprising a direct-injection steam exchanger.

11. Plant according to claim 1, characterized in that said means (6) for deactivating enzymes comprise a cooking (60) station which in turn comprises a heater (62), the heater (62) comprising means for conveying electrical current through the combination of the first and the second product.

12. Plant according to claim 1, characterized in that said means (6) for deactivating enzymes could comprise a single unit (62) which in turn comprises a plurality of heaters; said plurality of heaters could comprise one or more of the following heaters which can be activated alternatively:
  a first heater comprising a tube bundle or a tube in tube or a scraped surface heat exchanger;
  a second heater comprising a direct-injection steam exchanger;
  a third heater comprising means for conveying electrical current through the combination of the first and the second product.

* * * * *

UNITED STATES PATENT AND TRADEMARK OFFICE
CERTIFICATE OF CORRECTION

PATENT NO.         : 10,874,243 B2                                             Page 1 of 1
APPLICATION NO.    : 16/163815
DATED              : December 29, 2020
INVENTOR(S)        : Roberto Catelli et al.

It is certified that error appears in the above-identified patent and that said Letters Patent is hereby corrected as shown below:

In the Claims

In Column 8, Line 8, please change "moving a pure along the" to --moving a purée along the--.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*